Nov. 4, 1969  E. E. MAGAT ET AL  3,475,898

STATIC RESISTANT FILAMENT

Filed April 3, 1967

INVENTORS
EUGENE E. MAGAT,
WILLIAM H. SHARKEY,

BY

ATTORNEY

United States Patent Office 3,475,898
Patented Nov. 4, 1969

3,475,898
STATIC RESISTANT FILAMENT
Eugene E. Magat and William H. Sharkey, Wilmington, Del., assignors to E. I. du Pont de Nemours and Company, Wilmington, Del., a corporation of Delaware
Continuation-in-part of applications Ser. No. 419,807, Dec. 21, 1964, and Ser. No. 326,425, Nov. 27, 1963. This application Apr. 3, 1967, Ser. No. 641,405
Int. Cl. D02g 3/02; D01f; C08g 27/32
U.S. Cl. 57—140               22 Claims

ABSTRACT OF THE DISCLOSURE

Antistatic and antisoiling synthetic melt-spun drawn polyamide filaments having uniformly admixed therein as a distinct phase at least about two percent by weight of a high molecular poly(alkylene ether). The poly(alkylene ether) is uniformly distributed throughout the filament structure in the form of microscopic, elongated particles of specified particle size which are oriented in overlapping relationship with their longest dimension parallel to the major axis of the filament. These modified filaments have a minimum nuclear magnetic resonance peak ratio of at least about 1.0 and are highly useful as fibers, yarns, fabrics, etc.

CROSS REFERENCES TO RELATED APPLICATIONS

Figure 1:
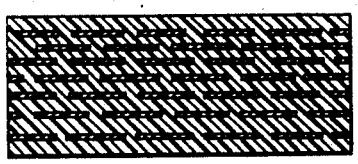

This application is a continuation-in-part of our copending U.S. applications Ser. No. 419,807, filed Dec. 21, 1964, now abandoned and Ser. No. 326,425, filed Nov. 27, 1963, now abandoned which in turn was a continuation-in-part of our earlier application Ser. No. 146,424, filed Oct. 20, 1961, now abandoned.

BACKGROUND OF THE INVENTION

The advent of filaments and fibers from wholly synthetic polymers has made possible textiles having a high level of durability, strength, wash-and-wear properties, and chemical inertness, combined with good aesthetics. However, these fibers are especially prone to develop static, which is objectionable during processing, and especially objectionable in wearing apparel, rugs, etc., under conditions of low humidity.

In attempts to avoid these difficulties, surface treatments by hydrophilic coatings, primarily polymeric, have been proposed. None of these coatings seem to have been entirely satisfactory, since many have lacked durability. If sufficiently insolubilized on fibers to be durable, they have produced fabrics with a harsh, unattractive hand.

Another approach to an antistatic fiber is via the copolymer route. Hydrophilic monomers are combined in the polymer chain by copolymerizing with a major portion of hydrophobic monomer. Although in some cases acceptable copolymer compositions have been discovered, these were obtained at the expense of reduced physical properties such as tenacity, elongation, stiffness, durability, wash-wear properties, alkali resistance, and the like.

Yet another approach to antistatic polymeric materials is to mix an antistatic agent with the polymer, usually prior to shaping. This technique is shown in the following patents.

U.S. Patent 2,872,432 to Metzger describes the production of antistatic resin compositions by incorporating therein relatively high molecular weight polyether glycols produced by coupling two or more polyether glycol molecules by reaction with a diepoxide. Polyamides are not mentioned. U.S. Patent 2,879,244 to Coler describes a process for making a destaticized polymeric molding powder by adsorbing an antistatic agent onto a finely divided solid "carrier" (e.g., a pigment) and adding this mixture to the polymer before polymerization. There is no disclosure of polyamides, or of compositions suitable for filaments. French Patent 1,071,781 discloses a pigment-coated granular polymeric molding powder, the pigment is adhered to the molding powder by pre-coating the polymer granules with from 0.05 to 0.2% by weight, based on the weight of molding powder, of an organic compound which may be a capped polyether glycol.

A factor which has complicated the search for an acceptable antistatic synthetic fiber is that no single universal threshold value based on one method of testing can be assigned to characterize an antistatic fiber. The ultimate decision is rendered by the subjective evaluation of the consumer, usually based on experience with some natural fiber, commonly accepted for the particular end use. Thus, the consumer will expect an antistatic nylon slip to be as good as cotton, and an antistatic rug to be as good as wool. Tests have been devised to make numerical comparisons, but to date a single test with a single value of acceptability has not been developed.

In order to provide the required opacity or covering power for synthetic filaments, it is customary to incorporate a delusterant, usually an inorganic pigment such as titanium dioxide, which makes them more or less opaque. This pigment, besides being an added expense in the fiber composition, is abrasive, causing yarn wear on guides and other surfaces. It also is known to decrease the light durability of many polymers, such as, for example, the polyamides. Yet another disadvantage for some end uses is that high concentrations of such delusterant produce a chalky fabric, without the customary surface luster.

SUMMARY OF THE INVENTION

It is an object of this invention to provide an oriented synthetic melt-spun polyamide filament which is substantially antistatic. In one embodiment, the filament has increased covering power due to the presence of internal voids, combined with a lustrous surface; these voids are produced by a scouring step. Fabrics from this polyamide filament have a unique luster and opacity, have decreased tendency to show soil, and have a high degree of silk-like resilience, hitherto unattainable. The luster is especially desirable in heavy denier-pre-filament pile fabrics, such as carpets.

In another embodiment of this invention, an antistatic polyamide filament is provided which will maintain a high level of antistatic behavior even after repeated washings, and which will require the addition of the minimum amount of antistatic material.

These and other objects are attained in filaments from melt-spinnable synthetic linear fiber-forming polyamides, having uniformly admixed therein as a distinct phase at least about 2% by weight, based on polyamide, of a high molecular weight poly(alkylene ether). The poly(alkylene ether) is uniformly distributed through the filament structure in the form of microscopic, elongated particles of specified particle size which are oriented in overlapping relationship with their longest dimension parallel to the major axis of the filament, giving the fiber a striated appearance, and specified minimum nuclear magnetic resonance (NMR) peak ratios, defined hereinafter.

Proper distribution of the poly(alkylene ether) as a separate phase in the fiber is essential in providing the antistatic product of this invention. It appears that elongated particles of the poly(alkylene ether) phase constitute the major electrical conductor in the fiber. Surprisingly, there has been no evidence of any conductive network connecting these particles in these hydrophobic polymers. The poly(alkylene ether) particles appear to be distributed as discontinuous rods. Since the major conducting phase, the poly(alkylene ether), is discontinuous, it seems that the static charge must be dissipated by conduction through the substrate polymer itself, in flowing from one poly(alkylene ether) "rod" to the next. Due to the high resistivity of the polyamides, the electrical paths through them must be kept as short as possible, and also of maximum cross-section perpendicular to the direction of current flow. This is attained in the fiber by providing a large number of closely and uniformly spaced conductive particles in the fiber cross section, which must overlap adjacent particles. The large overlap provides maximum current-carrying area in the high-resistance areas of the current path.

When filaments containing a water-soluble poly(alkylene ether) glycol are given an aqueous scour, a portion of the polyether is extracted. The product then becomes more opaque, yet retains its original surface luster. The opacity results from a multiplicity of elongated microscopic voids produced by extraction of a portion of the poly(alkylene ether). When the poly(alkylene ether) is uniformly distributed in the drawn fiber as rod-like particles of 0.05 to 1.5 micron diameter, and substantially greater than 15 microns long, sufficient poly(alkylene ether) is retained even after repeated washings, so that the fiber conductivity is at least ten times that of the fiber to which no poly(alkylene ether) has been added. It is believed that capillary forces in the small-diameter capillaries are sufficient to retain some poly(alkylene ether), while that which is present as particles of larger diameter than 1.5 micron is extracted on washing. Since the fiber must contain at least about 0.5% of the poly(alkylene ether) after extraction to provide permanent antistatic protection, the greater part of the 2% of poly(alkylene ether) initially added should be present (before scouring) as uniformly distributed rod-like particles as defined above. Particles of the poly(alkylene ether) having a smaller diameter than 0.05 micron or a length less than 3 microns apparently do not contribute significantly to fiber conductivity. The preferred size range is 0.1 to 1.0 micron diameter. In general, the longer the particles, the better the fiber conductivity. For poly(hexamethylene adipamide), the length of the particles should be at least 15 microns, preferably 40 to 50 microns. For other polyamides (e.g., Example XXII), particle length of 90 to 200 microns may be obtained.

DRAWINGS

Figure 2:
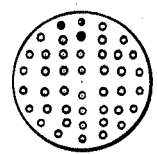

Idealized cross-sections of the filaments of this invention are illustrated in the drawings in which FIGURE 1 is a diagrammatic illustration of a longitudinal cross-section of a filament showing the rod-like poly(alkylene ether) particles distributed along the length of the filament; and FIGURE 2 is a transverse cross-section of the filament of FIGURE 1 showing the substantially uniform distribution of the poly(alkylene ether) particles in the filament. The structure of the filaments after scouring, i.e., after extraction of a portion of the poly(alkylene ether), is changed to the extent that elongated voids remain where the polyether has been removed.

The poly(alkylene ethers) which may be incorporated in the hydrophobic polymer are either ethylene oxide or ethylene oxide-higher alkylene oxide condensation products. Thus, the products consist predominantly of repeating divalent ether radicals selected from the group consisting of ethylene ether, propylene ether, isopropylene ether and tetramethylene ether, with the proviso that there are a sufficient number of ethylene ether radicals so that the product is water-soluble. As is apparent, the number of ethylene ether radicals necessary to make the poly(alkylene ether) water-soluble will vary depending on the other components present; the suitability of any particular polyether is readily determined by the cloud point definition given hereinafter. Preferably, the poly(alkylene ether) is an ethylene oxide polymer.

For the embodiment providing maximum covering power and best soil-hiding (called "antisoiling embodiment" herein for convenience), the poly(alkylene ether) added is a water-soluble poly(alkylene ether) glycol, the alkylene oxide chains being terminated by at least two —OH radicals.

For the embodiment requiring the maximum in antistatic properties with addition of the minimum amount of poly(alkylene ether) and minimum or no change in opacity or scouring (called "antistatic" embodiment), one or both —OH radicals of the glycol are replaced by terminal capping radicals, which are ether end groups of the formula —OR, where R is an alkyl, aryl, or aralkyl group, such as methyl, ethyl, i-octyl, decyl, lauryl, tridecyl, nonylphenyl, dodecylphenyl, phenyl, naphthyl, and the like. Residues of coupling compounds or multi-functional chain-initiating agents, such as bis-phenols, diamines, glycols, and the like, may be present within the poly(alkylene ether) chain. The polyether part of the chain should constitute at least 50% by weight of the capped poly(ethyene oxide) and should contain at least 10 ethyleneoxide units, and preferably at least 40 such units. The preferred end group is nonylphenoxy, since polyethers with this type of end cap show exceptional thermal stability at polyamide processing temperatures. Good thermal stability is also obtained using the polyethers disclosed by Magat and Walker in Belgian Patent 649,972.

For both embodiments, it is essential to avoid functional groups which are reactive with the polyamide, since durability, molecular weight, and other physical properties of the polyamide are adversely affected by copolymerization with poly(alkylene ether). For these reasons it is generally desirable to avoid polyethers with ionic groups.

In order to provide the particulate striated form in the hydrophobic polymer, the poly(alkylene ether) must be substantially insoluble in the polyamide, or at least must be added in an amount such that at least 2% of the polyether is present as a second phase. In addition, it must be stable under melt spinning conditions for the hydrophobic polymer; that is, it must not appreciably decompose or volatilize during the spinning step.

Uniformity of distribution of the poly(alkylene ether) is essential in providing filaments of the present invention. Uniformity of distribution is doubly important for the antisoiling embodiment, since non-uniformity will lead to differences in fiber opacity, producing fabrics which are streaky after scouring. Uniformity on a gross scale, i.e., one pound of yarn, is satisfactory when the poly(alkylene ether) concentration is kept constant during manufacture, within limits of ±10% of the average concentration. Additionally, uniformity of poly(alkylene ether) distribution within the yarn bundle should be maintained. A convenient measure of this uniformity is given by the density spread of the scoured yarn which is more fully explained later herein in Example V. The required uniformity is characterized numerically by the requirement that the square of the standard deviation of the density measurements of thirty (scoured) filaments taken across the yarn bundle should not exceed $4 \times 10^{-5}$, and preferably should not exceed $1 \times 10^{-5}$.

Within the filament, the polyether should also be evenly distributed, both as to size (diameter) and number of particles. Preferably, there should be at least 15 particles of 0.1 to 1.0 micron diameter visible in each drawn filament cross section.

An important requirement for the poly(alkylene ether) suitable for the antisoiling embodiment of this invention is that it be water-soluble. This is essential in order to provide the void-containing structure in the scoured fiber, required to give the fiber its increased covering power and ability to hide soil. Such water-soluble poly(alkylene ethers) have a cloud point of at least 30° C., as hereinafter defined. Since the polyethers show a "reversed"

solubility, in that they precipitate from aqueous solution on heating, those which are preferred show no cloud point up to boiling of the solution.

The balance between the level of antistatic properties and opacity after scouring can be varied by adjusting either the concentration, the end groups or the molecular weight of the poly(alkylene ether), or the diameter of the poly(alkylene ether) particles. For example, to obtain a practical improvement in covering power, at least 3% of a readily extractable poly(alkylene ether), such as a polyethylene ether glycol of 20,000 mol. wt. should be added. For the antistatic embodiment, where opacity change is not desired, polyethers are selected which are not as easily extracted, such as polyethers capped with at least one nonyl-phenyl end group, or the poly(ethylene-propylene) ether glycols. These may be added at a minimum concentration of about 2% to provide permanent antistatic effect with a minimum loss of additive on scouring. For those products in which high covering power and high surface luster are required, high concentrations (i.e., 5 to 15%) of linear polyethylene ether glycol are used. After scour, the residual polyether content in a polyamide fiber is about 2% to 3%, providing satisfactory static protection.

In general, more than 15% of the poly(alkylene ether) in filaments offers no advantage, and often is undesirable, making spinning difficult or impossible. However, larger concentrations may be mixed with nylon for subsequent mixing with unmodified nylon prior to spinning.

By combining suitable proportions of the more easily extractable polyether glycol, the less easily extractable capped polyethylene ether, such as nonylphenoxy capped polyethylene ether, and $TiO_2$ delusterant, fibers can be prepared having almost any desired degree of antistatic property, covering power and surface luster. A larger amount of the polyether may be required in the presence of $TiO_2$ since this additive seems to have an adverse effect on the log rho of some polyamides. As previously indicated, the particular poly(alkylene ether) utilized will depend on the properties of the hydrophobic polymer as well as the properties desired in the final product. To obtain the proper dispersion of the polyether in the hydrophobic polymer, combinations should be selected having an interfacial tension of not over about 9 dynes per cm., as will be explained hereinafter.

For use with polyamides, to make the antisoiling embodiment, the polyethylene ethers having —OH ends, i.e., glycols, should have a molecular weight of at least 1,000, and preferably 6,000 to 30,000. These are added in concentrations of from about 3% to about 15%. When these polyethylene ethers are capped on one or more ends with ether radicals for use in the antistatic embodiment, they apparently have improved stability and reduced volatility, so that lower molecular weight polyethers may be used. From 2% to about 10% of these poly(alkylene ethers) may be added.

In preparing the products of the present invention, the poly(alkylene ethers) which do not react with the polyamide may be added during polymerization or may be mixed with the monomeric constituents prior to polymerization. It is usually desirable to use a polymerization autoclave equipped with a stirrer, in order to distribute the polyethers uniformly. Stirring should be continued until the polymer is extruded. Filaments may then be melt-spun and drawn in the usual way.

Preferably, the poly(alkylene ether) is mechanically mixed directly with the preformed, fiber-forming, polyamide and preferably immediately spun into fibers. This method provides a very uniform mixture, and minimizes thermal degradation of the poly(alkylene ether). The poly(alkylene ether) and the fiber-forming polymer blend may be spun as a melt to form fibers, and drawn in the usual way.

When the polyamide and the poly(alkylene ether) are melt-blended after polymerizing, a mixing step is essential in order to distribute the poly(alkylene ether) sufficiently uniformly. Melting the components in a screw extruder is usually satisfactory, although mechanical mixers are more effective, due to the high melt viscosity of the polyamide and the poly(alkylene ether). Suitable melting and mixing extruders are described by F. C. Schutz: "Dual Screw Extruders," SPE Journal, pp. 1147–1151 (September 1962). See also Saxton, U.S. Patent 3,006,029, for a useful mixing screw extruder. Helical ribbon mixers may also be employed. Excessive mixing must be avoided, since this may reduce the size of the poly(alkylene ether) particles so that they no longer effectively conduct the static charges away.

To promote effective mixing of the poly(alkylene ether) and the nylon, a polyether should be selected which has a surface tension such that, when mixed with the nylon, their interfacial tension will be not over about 9 dynes per cm. at the melt-blending temperature. The interfacial tension is the difference between the surface tensions of the two polymers at the specified temperatures. The closer the match between surface tensions, the easier it will be to disperse the polyether in the hydrophobic polymer.

As a guide in obtaining the proper dispersion of the polyether in polyamides, the melt blend of the polyether and the hydrophobic polymer must be mixed sufficiently to provide approximately spherical polyether particles of from 1 to 20 microns in diameter, or ellipses or cylinders of the same volume. Particles of less than 1 micron in diameter do not contribute to the conductivity of the fiber, and particles greater than 20 microns in diameter cause spinning interruptions. It is preferred that the particles be kept to 2 to 5 microns diameter, with very few particles as large as 10 microns. Uniformity of distribution in the molten polymer transfer lines and spinning manifold is improved by use of flow inverters such as disclosed in U.S. 3,128,794. The particle size of the polyether is measured microscopically on cross sections of polymer samples taken from the spinning pump outlet prior to entering the sand filter pack.

The polyether may be injected into the molten polyamide as a melt or as a concentrated aqueous solution. When injecting polyethers of relatively low molecular weight, or in relatively large amounts, it will often be convenient to add a thickening agent to the polyether to increase its melt viscosity. Suitable thickening agents are poly(methyl methacrylate), poly(vinyl butyral) and poly(vinyl acetate). Such thickening agents also help improve the accuracy of metering the polyether using a conventional spinning pump.

An aqueous extraction step is required if the filaments of the antisoiling embodiment of the instant invention are to provide increased covering power. They may be extracted in fabric form, e.g., the fabric may be water-extracted in the dye bath, or in a conventional boil-off or scour, preferably in the presence of soap, a synthetic detergent, an alkaline scouring agent, or similar composition. Depending on the amount and type of poly(alkylene ether) used, the fabric may develop varying degress of opacity during the water-extraction step. Alternatively, a yarn prepared from the extruded filaments may be extracted prior to fabric preparation. In this latter procedure the benefit of fiber swelling upon fabric geometry is not obtained.

The temperature of the scouring bath when the yarn or fabric containing the polyester is first immersed will affect the amount of polyether extracted. For example, initial contact with cold water is better than with hot water for extracting the polyether, especially at levels of more than 5% polyether. Such treatment is preferred for fibers of maximum opacity and freedom from soil. After an initial cold water wash, the scour may then be completed at the boil, as is conventional. Conversely, if the yarn or fabric is immersed in the bath at the boil, a minimum of the polyether will be extracted.

An additional structural requirement of the fibers of this invention is that they must have a fluid-like molecular motion at room temperature, as identified by nuclear magnetic resonance (NMR) techniques. The NMR spectrogram typical of nylon shows a broad adsorption "hump" corresponding to a restricted type of molecular motion. When the poly(alkylene ether) is added, there is superimposed a very narrow peak, corresponding to rapid proton motion. The derivative curve of the spectrogram is recorded by the spectrometer; measurements are made on this curve. The height of the derivative curve of the narrow peak divided by the height of the derivative curve of the "hump" gives a numerical value for the amount of this motion, which is termed the "peak ratio."

A "peak ratio" above the specified minimum is a necessary condition for the conductive polyamide fibers of this invention, as shown in examples which follow. The NMR peak ratio appears to measure the amount of modified polymer in the fiber. The NMR peak ratio, in conjunction with the limitations previously set forth, is essential in defining the fibers of this invention. When unmodified polymer, containing no poly(alkylene ether), is also present during the NMR determination, the peak ratio is decreased, by a "dilution" effect.

Acceptable 66 and 6 nylon filaments of this invention have a peak ratio (measured in dry nitrogen) of at least 1.5. For other polyamides, the peak ratio should exceed 1.0. Typical peak ratio for highly antistatic fiber may exceed 2.5 or more. Unmodified nylon has a peak ratio of zero.

NMR peak ratios are measured on dry fiber. The determination is made in an atmosphere of flowing nitrogen dried over a desiccant. Best reproducibility is obtained when the NMR measurement on a given sample is repeated at increasing time intervals in the presense of the flowing dry nitrogen, until a constant value is attained. The interval should be at least fifteen minutes with thirty minutes being preferred.

The NMR spectrum is measured using the nuclear magnetic resonance equipment of Varian Associates, Model V–4302 Dual Purpose Spectrometer and their high temperature probe insert Model No. V–4331 TWL. Radio frequency energy of 56.4 mc./s. is used at an attenuation setting of 17 decibels and with a sweep modulation amplitude of one gauss. Yarns are wrapped taut around very thin glass rods and the ends tied to prevent shrinkage if heating is employed. This wrapping, therefore, provides a random placement of the fiber axis with respect to the magnetic field direction so that an average NMR spectrum is obtained at any temperature. As described by J. G. Powles, Polymer 1, pp. 219–265 (1960), polymers such as those modified herein by blending with the poly(alkylene ether) give an absorption spectrum which can be used for measurement of peak height, with and without the addition of poly(alkylene ether).

As previously explained, the fibers of this invention require distribution of the poly(alkylene ether) in a specified particle size range. Measurement of the length and diameter of the poly(alkylene ether) particles in the fiber requires the use of a light microscope capable of 3,000× magnification and a resolution of 0.25 micron. This requires the usual techniques of oil immersion lens and condenser, short wavelength monochromatic light (4360 A. is used) and coherent illumination.

The length of the polyether particles is most easily measured using photomicrographs taken perpendicular to the fiber axis at known magnification. Clearer views are obtained if the filament is sectioned longitudinally. For better contrast, the yarns are scoured before examination, thus removing most of the poly(alkylene ether).

The cloud point, as used herein, is that temperature at which turbidity first appears on heating a solution containing 1% polyether and 0.1% trisodium phosphate

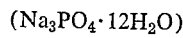

in water (percents by weight), starting at room temperature.

The surface tension of the polyether or the hydrophobic polymer is determined using the "maximum bubble pressure method," which involves the measurement of the air pressure required to force air from a capillary submerged in the polymer melt. The surface tension is given by the formula (c.g.s. units)

$$P = 2S/r + gdh \qquad (1)$$

where P is the pressure required in the capillary, S is the surface tension, r the capillary radius, d the density of the liquid, h the depth of immersion of the capillary tip and g the acceleration of gravity.

The interfacial tension $I_{A/B}$ is calculated from the expression $$I_{A/B} = S_A - S_B \qquad (2)$$

where $S_A$ is the surface tension of liquid A saturated with B, and $S_B$ is the surface tension of liquid B saturated with A.

The static propensity of fabrics is often reported in terms of the direct current resistance in ohms per square (the units of area being immaterial), measured parallel to the fabric surface at the given temperature and humidity, according to the A.A.T.C.C. method, C–76–59. Numerical values are conventionally reported as "log R," which is the logarithm (to the base 10) of the resistance in ohms. High values indicate a tendency to acquire and retain a static charge. Testing is carried out at controlled temperature and humidity. Unless otherwise indicated, conditions of 24° C. and 30% relative humidity are employed.

Although this method provides an approximate measure of static propensity, it does not take into account differences in the total yarn cross section in the current path. For example, one fabric might have twice as many yarn ends per centimeter as another made of the same yarn and polymer. The first would show twice the conductivity of the second. To avoid this error, most of the conductivities are reported as log rho, which is the logarithm of the specific resistance. The specific resistance is the resistance, in ohm, of 1 cm. of fiber (along the fiber axis) divided by the total cross section (in cm.²) of fiber in the current path. The specific resistance provides a uniform measure of static propensity when, as here, conduction is through the bulk, in contrast to the surface, of the fiber.

For polyamide yarns having an average density of 1.15, the following expression relates log R to log rho:

$$\log R = \log \text{rho} + 6 - \log (Pd) \qquad (3)$$

wehre P is the number of picks (yarn ends) per cm., and d is the total denier in each pick (yarn end). For many of the fabrics used herein, log (Pd) is 3.5 to 4.1, so that Equation 1 may be approximated as:

$$\log R = \log \text{rho} + 2.2 \qquad (4)$$

Charge decay is another method of characterizing static propensity. This method measures the time required for a charge impressed on a fabric to decrease to one half its initial value.

Other means of characterizing static propensity are employed in some of the examples when these are particularly appropriate to some specific end-use; for example, the "shuffle test" for carpets, and the "clinging tendency" test used for slips.

The "wash" used to simulate home laundering is carried out as follows. The fabrics are washed in a tumble-type washing machine using a synthetic detergent with a water temperature of 38° C. The washed fabrics are given a final spin to extract excess water, followed by tumble drying at 77° C.

Throughout the specification and claims, by "average molecular weight" it is meant the number average molecular weight.

The following examples, in which parts and percentages are by weight unless otherwise specified, further illustrate the present invention.

EXAMPLE I

A 48% aqueous solution of hexamethylene diammonium adipate (66 nylon salt) and 0.3 mol percent (based on salt) of a 25% aqueous acetic acid solution (viscosity stabilizer) are charged to an evaporator and concentrated to 60% at atmospheric pressure. The 60% salt solution is transferred to an autoclave equipped with a stirrer, and is heated in the closed vessel until the steam pressure reaches 250 lbs./sq. in. (temperature, 210° C.) over a period of about twenty minutes. The autoclave stirrer is then started. Heating is continued until the temperature reaches 235° C., at which time a 25% aqueous solution of a polyethylene ether glycol of 20,000 molecular weight is pumped in. This polyether shows no cloud point up to 100° C. Sufficient of the polyethylene ether glycol is added to correspond to 15% of the weight of unmodified polyhexamethylene adipamide. Heating is continued with the temperature increasing while maintaining a pressure of 250 pounds by bleeding off steam. When the temperature reaches 240° C., steam is bled off more rapidly, reducing the pressure continuously over about ninety minutes to atmospheric pressure.

Heating at atmospheric pressure is continued at about 275° C. to complete the polymerization. The autoclave is discharged by extruding the polymer as a ribbon under 100 pounds pressure of inert gas. The ribbon is quenched on a water-cooled casting wheel and cut to flake. The polymer flake has a relative viscosity of 34.4 (relative viscosity is defined in U.S. Patent 2,385,890). This batch of modified polymer is coded sample A. By analysis for adipic acid content the weight percent of polyamide in the polymer is calculated. The difference in weight indicates a polyether content of 15.6%.

The polymer flake thus prepared is melted into a stirred melt pod on a grid blanketed with steam, extruded through a filter pack and a thirteen-hole spinneret, in conventional manner. The filaments are quenched, wound up, and subsequently drawn to produce an approximately 40-denier yarn. Processing conditions used for unmodified polyhexamethylene adipamide (66 nylon) are employed.

The yarn produced is twisted, sized and woven into a taffeta fabric. Portions of the fabric are finished in a conventional manner using a jig scour, under minimum tension, at the boil for thirty minutes. The fabric is then dried at 120° C. on a pin tenter, followed by heat-setting at 205° C. for twenty seconds using 5% overfeed and 5% underwidth.

In like manner, a fabric, designated sample B, containing 10% of the 20,000 molecular weight polyether compound is prepared and finished.

Portions of the original fabrics are tested for log rho with the results shown in Table 1. The fabrics are then scoured at the boil for one hour and dried. Log rho is again determined. The polyethylene ether glycol content of the scoured fabrics is estimated by determining the weight loss on scouring, making allowance for the normal amount of finish and size that is also removed by this step. The estimated amounts are shown in Table 1, and indicate that approximately 2% to 8% polyether compound remains in the fabric, the amount depending in part on the initial concentration. When the high molecular weight polyether compound is employed, (sample C) approximately 8% of the polyether compound remains in the fabric. It is noted that the fabrics in unscoured and scoured state have attained a satisfactory degree of static protection, since cotton, a satisfactory fabric in this respect, has a log rho of 11.0. In comparison, unmodified 66 nylon has a log rho of over 13.5. A drop of oil placed on scoured fabric sample A spreads to a lesser extent and is more completely removed by blotting than is a drop of oil placed on an unmodified nylon fabric.

Other swatches of the original fabrics are given a conventional size-removing scour, heat-set, and the log rho determined. Other treatments include a severe scour following the heat-setting, forty home laundry washings, and ten standard dry-cleaning cycles using a conventional dry-cleaning soap. The log rho of these samples is shown in Table 1.

TABLE 1

| Sample | A | B |
|---|---|---|
| Polyethylene ether glycol, mol. wt | 20,000 | 20,000 |
| Amount added (percent) | 15 | 19 |
| Log rho [1] initial | 9.4 | 9.0 |
| Amount remaining after scour [2] (percent) | 3-4 | 2-3 |
| Log rho after scour, 40 washes | 10.3 | 10.0 |
| Log rho after mild scour and heat-setting | 8.9 | 9.4 |
| Log rho after heat-setting and one hour severe scour | 10.5 | 10.6 |
| Log rho after heat-setting and 40 washes | 9.7 | 10.8 |
| Log rho after heat-setting and 10 dry cleanings [3] | 8.9 | 9.5 |

[1] At 25° C., 30% R.H.
[2] Severe scour, one hour at the boil, in aqueous 0.125% sodium lauryl sulfate, 0.1% trisodium phosphate.
[3] Dry cleaned in perchlorethylene, using 4% of a sodium mahogany oil sulfonate dry cleaning soap.

From the data in Table 1, it is apparent that permanent antistatic protection, substantially equivalent to cotton, is obtained using both the 10% and 15% concentrations of the polyether compound of 20,000 molecular weight.

Although fabric samples contain no delusterant, it is observed that they retain the surface luster typical of bright polyamide yarns. Prior to boil-off (scour) they have the relatively low covering power typical of bright (non-delustered) yarn. However, after scour, the fabrics have covering power which exceeds that of fabrics of similar construction containing from 0.3% to 2.0% $TiO_2$. In addition, the fabrics have a drier hand.

When longitudinal sections of the scoured fibers of fabric sample A are examined under the microscope, it is observed that the yarn is full of narrow channels which appear as circular voids in the cross section. These voids represent volume elements from which the polyether phase has been extracted. The channels are of the order of one micron in diameter. These narrow channels vary in length. Many are at least several fiber diameters long. These voids scatter incident light, producing a fabric of high covering power. Examination of the surface of these fibers shows that a few of the channels extend to the fiber surface.

It is observed that the dimentions of a dry fiber removed from fabric A are substantially the same prior to and after scour. Since the scoured fiber contains voids, it is necessarily less lense. Density determination for fabric A shows a density of 1.04 after scour, as compared to 1.14 before scouring. The latter figure corresponds to that of unmodified 66 nylon. Thus, a lighter weight fabric is produced.

During the step in which the polyether compound is extracted from the polyamide filament, a highly unusual swelling phenomenon is observed. The diameter of a filament of sample A (prior to scour), immersed in water, is measured at gradually increasing temperatures, with the results reported in Table 2 as percent swelling, based on the initial fiber diameter, dry, at room temperature (about 25° C.).

TABLE 2

| Temperature: | Percent swelling |
|---|---|
| 25° C., dry | 0 |
| 25° C., wet | 5 |
| 50° C., wet | 5 |
| 75° C., wet | 5 |
| 100° C., wet | 65 |

In comparison, unmodified 66 nylon swells no more than about 5% to 6% at the boil.

When the test is repeated on a scoured fiber, the fiber swells only about 5% to 6%, showing that the high swellability occurs once only, when the polyether compound is extracted from the filament. The high swellability produces changes in fabric geometry whereby fabrics of higher bulk and silk-like hand are produced.

Another fabric sample, C, is prepared, corresponding to sample B, except that in this case 7% of the 20,000 mol. wt. polyethylene ether glycol and 0.26% $TiO_2$ are added. After scouring, the log rho is 10.7. Rod-like particles of the polyether compound resembling the disconnected mercury column in a defective thermometer are clearly visible in a longitudinal view of the filament at 1500× magnification.

Microscopic examination of the structure, using the sectioning technique described previously, shows that the voids produced by extraction of the polyether compound are less than 0.7 micron in diameter, and are over 15 microns long. The NMR peak ratio (scoured yarn, dry) is 2.0. For unmodified, dry nylon, the NMR peak ratio is zero.

Another similar sample, D, containing 5.0% of the 20,000 mol. wt. polyethylene ether glycol is prepared. Due to excessive homogenization during processing, this fiber has about 2.5% of the polyether compound present as particles from 2 to 3 microns long and less than 0.7 micron in diameter while the rest of the polyether compound is present as even smaller particles. Consistent with the poor structural distribution of this polyether compound, the log rho is 12.8, indicating too low a level of static protection for many uses.

EXAMPLE II

Seventy-denier, thirty-four filament polyhexamethylene adipamide yarn of Y-shaped cross section is prepared according to the procedure for sample A of Example I; the polymer blend contains 15% polyethylene ether glycol of 20,000 molecular weight. A similar 70-denier, 34-filament yarn of unmodified polyhexamethylene adipamide having the same cross-sectional configuration is prepared as a control.

Fabrics of similar construction are woven from these yarns, both in a plain weave and a twill construction. The fabrics are scoured at the boil for one hour in 0.5% synthetic detergent, and then heat-set in a relaxed condition for three minutes at 180° C., followed by dyeing. The bulk of these fabrics is measured with the results shown in Table 3.

TABLE 3

| | Loom Construction | Finish Construction | Finished Fabric Weight, oz./yd.² | Bulk, cc./gm. |
|---|---|---|---|---|
| Plain Weave: | | | | |
| Polyether Blend | 100 x 68 | 120 x 80 | 1.82 | 2.8 |
| Unmodified Control | 100 x 80 | 112 x 94 | 2.16 | 1.77 |
| Twill: | | | | |
| Polyether Blend | 100 x 86 | 120 x 100 | 1.92 | 2.58 |
| Unmodified Control | 100 x 90 | 114 x 108 | 2.27 | 1.75 |

A cross section taken perpendicular to the warp yarn of the plain weave test fabric containing the polyether compound (prior to scour) is photographed under a microscope at high modification. The yarn consists of fairly loose fiber bundles. The fabric is then scoured at the boil for one hour, dried, and again photographed. It is noted that the fiber bundles have become more compact and the filling yarn has acquired a more pronounced weave crimp, increasing the fabric bulk. In contrast, a photograph of the unmodified control fabric (after boil-off) shows the yarn bundle to be flattened, and the weave crimp is not better than the test fabric before boil-off.

EXAMPLE III

A solution consisting of 3,860 grams of caprolactam, 681 grams of polyethylene ether glycol of 20,000 molecular weight and 454 grams of water is charged to an autoclave and heated according to the schedule used in Example I, except that the mixture is held for thirty minutes at 250 p.s.i.g. and 270° C. before pressure reduction is begun. The resulting 6-nylon polymer contains 15% of the polyether compound. Yarn is spun from the polymer blend, as in Example II.

The yarn has a log rho of 11.1, which increases only to 11.4 after boil-off. The log rho of unmodified 6-nylon is over 13.5.

EXAMPLE IV

A melt blend (A) is prepared by stirring 95 parts of polyhexamethylene adipamide flake with 5 parts of polyethylene ether glycol of 20,000 molecular weight for one-half hour under nitrogen at 285° C. The polymer blend thus prepared is melted in a screw melter and extruded from a spinneret to form filaments which are drawn about 4× and then scoured at the boil for one hour. The fiber has a log rho of 10.5. A photomicrograph of the fiber A shows a striated appearance characteristic of properly distributed polyether glycol.

Using the same polyether glycol, a second sample, B, is prepared; in this case, the melt-blended flake is melted on a grid in a nitrogen atmosphere. The analytical concentration of the polyether glycol in the yarn is 2.5%. At this concentration, the structural distribution of the polyether can be easily analyzed. The particles are present as rods which are over 15 microns long and less than 0.5 micron in diameter. The log rho is 11.4 even at this low polyether concentration, due to the good distribution of the polyether. The NMR peak ratio of the scoured, dried yarn is 2.3.

The experiment is repeated except that 95 parts of polyhexamethylene adipamide flake is heated to 100° C., and is tumbled with 5 parts of polyethylene ether glycol of 20,000 molecular weight. The polyether is a liquid at 100° C., so that it becomes relatively evenly distributed over the surface of the nylon flakes. The polymer mixture (coded batch C) is placed in a nitrogen blanketed, heated cylinder, one end of which is closed with a sand filter and a spinneret. After heating until the polymer is completely melted, a piston forces the molten mixture through the orifices to form filaments, which are quenched and drawn as before. The log rho of this yarn, after drawing and scouring, is 12.2. Although the filament shows a striated appearance, the polyether phase in C is much less uniformly distributed than in A.

Test C is repeated with reduced amount of polyether glycol, so that only 2.5% is present in the test filaments D. After scouring, the log rho of yarn D is 13.5, which is no better than unmodified nylon. Microscopic examination of the structure shows the polyether particle diameter greater than 0.7 micron and average particle length less than 3 microns. The NMR peak ratio of the dry filament is 0.7.

EXAMPLE V

A batch of yarn (50-60 lbs.) is prepared by autoclave addition of 5% of a polyethylene ether glycol of 20,000 molecular weight as described in Example I. The flake is melted on a heated grid in a steam atmosphere. A melt pool stirrer is employed. Yarn is spun and drawn 2.95×. The drawn yarn is coded Batch A.

For comparison purposes, 95 parts of polyhexamethylene adipamide flake is heated to 100° C., and is tumbled with 5 parts of polyethylene ether glycol of 20,000 molecular weight, as in Example V. The polyether is a liquid at 100° C., so that it becomes evenly distributed over the surface of the nylon flakes. The polymer mixture (coded Batch B) is then melted and spun, using a conventional nylon grid melting unit, without a melt pool stirrer, as described in U.S. Patent 2,217,743. The yarn is drawn 3×. Yarn samples taken from about the midpoint of each run, representative of steady-state conditions, are selected for test, using the following procedures. The yarns are scoured prior to testing.

(1) Conductivity.—Single filaments (5 from each yarn bundle) are tested for conductivity. The filament to be tested is wrapped fifty times around two parallel prongs 2 cm. apart, held in position by polytetrafluoroethylene supports. The prongs are connected to a 220V source and the current measured with an ultra-sensitive ammeter. The samples are conditioned for forty-eight hours at 26% RH before testing.

(2) *Concentration.*—Relative concentration of the polyether glycol is measured using microscopic techniques. The method consists basically in measuring total volume of voids in a short filament length by determining their number and length, assuming uniform void diameter. Three consecutive sections of each filaments are prepared and mounted. Each section is 4 microns thick, so that the total fiber length examined is about 12 microns. Photographs of the top and bottom of each fiber section are taken.

On each cross section, every clearly visible void is assumed of equal length. The ratio of total number of voids counted on the three cross sections to the square of the mean filament diameter is taken as the relative measurement of polyethylene ether glycol concentration. The mean filament diameter is the average of two perpendicular diameters chosen so that one of these measures the long axis of the slightly elliptically-shaped cross sections.

(3) *Density.*—Uniformity of fiber density in the scoured filament is a very sensitive measure of uniformity of polyethylene ether glycol distribution in the yarn. The density gradient tube method is used to measure filament density, as described tube method is used to measure filament density, as described by Boyer, Spencer and Wiley, J. Polymer Science, I, 249 (1946). Three consecutive ½–1 cm. length yarn pieces, making a total of 39 filaments are put in a tube at one time. The density at every level is ascertained from the floating levels of glass balls of known density. A linear relation at intermediate distances is assumed.

(4) *Shrinkage.*—The two yarns show different degrees of shrinkage and shrinkage uniformity. Tests are made on 5 filaments of each sample, and four to six tests are made on consecutive lengths of each filament. The test length in each case is 80 cm. measured on yarn tensioned at about 0.01 g.p.d. Each sample is heated in a hot air oven for five minutes at 160° C., then cooled in air for five minutes at room temperature, while free to retract. The length is again measured. The percent shrinkage, based on the original length, is reported below.

The data obtained are listed in Table 4, along with similar data for denier, tenacity, elongation and modulus.

TABLE 4

| | Sample | |
|---|---|---|
| | A | B |
| | Process | |
| | Melt-blending | Flake-coating |
| (1) Conductivity range, amps $\times 10^{13}$ | 15–18 | 6–16 |
| (2) Average relative concentration | 30.7 | 23.4 |
| (3) Standard deviation | ±0.6 | ±1.9 |
| (4) Density: | | |
| No. of filaments | 39 | 39 |
| Density range | 1.1040 | 1.105–1.125 |
| | 1.05–1.98 | 0.75–1.97 |
| (5) Irreversible free shrinkage, range percent | 4.2±0.2 | 4.3±0.2 |
| Tenacity, g.p.d. | 42.1±6.1 | 40.0±6.0 |
| Elongation, percent | 18.9±2.6 | 24.2±1.6 |
| Initial modulus, g.p.d. | | |

The above results show the importance of melt blending to obtain the uniform yarn product of this invention. Omitting a blending step gives non-uniform conductivity and non-uniform filament density. Even though photomicrographs of the two yarns do not suggest to the untrained eye large differences in polyethylene ether glycol concentration or distribution, the quantative techniques described above demonstrate the non-uniformity numerically. Such non-uniformity leads to the production of non-uniform, streaky fabric, readily observable after scouring.

In order to further characterize the uniformity of yarns A and B, the density of a second series of 30 filaments from each bundle of the scoured yarn are individually determined, and the average density and the square of the standard deviation are calculated. For comparison purposes, similar measurements are made on filaments from a yarn C produced by injecting the polyether glycol directly into a mechanical mixer which supplies polymer to the transfer unit, which is the preferred method for adding the polyether to the polyamide. The results are shown in Table 5.

TABLE 5

| | Sample | | |
|---|---|---|---|
| | C | A | B |
| | Process | | |
| | Melt blending in— | | Flake Coating |
| | Transfer line | Autoclave | |
| Avg. density, gm./cc. | 1.1115 | 1.0927 | 1.1095 |
| (Sigma)$^2 \times 10^7$ | 14 | 206 | 670 |
| 95% confidence limits for (sigma$^2 \times 10^7$) | 11–17 | 169–257 | 549–836 |

EXAMPLE VI

Ninety parts of polyhexamethylene adipamide and ten parts of a poly(ethylene-propylene) ether glycol are melt-blended by stirring the melt under nitrogen at about 285° C. The polyether employed is a copolymer of about 2000 mol. wt., having a polypropylene ether content of about 60%. It has a cloud point of 61° C.

The melt blend is extruded from a spinneret, the filament are drawn, scoured and tested for conductivity. They have a log R of 11.2 and a log rho of 8.9.

EXAMPLE VII

Polymer is prepared in an autoclave from 55% aqueous solution of the salt of bis(4-aminocyclohexyl) methane and azelaic acid. 7.9 millimols of acetic acid are added for every mol of the polyamide salt. One-half percent (based on weight of final polymer) of sodium phenyl phosphinate antioxidant is added. The salt solution is heated under 280 bs./sq. in. pressure for two hours while the temperature is raised to 206° C. During the heating period, when the temperature reaches 220° C., a 25% aqueous solution of a polyethylene ether glycol of 20,000 molecular weight is added in sufficient amount to make concentrations indicated in Table 6. The pressure is then reduced to atmospheric, the temperature raised to 300° C. and the polymer held under these conditions for one hour. It is then extruded and cut to flake. The polymer is melted and filaments are extruded at a temperature of 280° C. through a five-hole spinneret, and the yarn is wound up at 200 yds./min. The yarn is then drawn three times its extruded length over a three-inch diameter pin at a temperature of 150° C., at a speed of 50 yd./min. After a scour of one hour, the log rho values indicated in Table 6 are observed. In a second test on unscoured filaments, the percent volume increase at various water temperatures is indicated. An exceptional degree of swelling is observed, especially in the sample B containing the larger amount of additive. The scoured yarns have opaque appearance.

TABLE 6

| | A | B |
|---|---|---|
| Molecular weight of polyether glycol | 20,000 | 20,000 |
| Amount, polyether glycol, percent | 15 | 30 |
| Log rho after aqueous scour | 10.0 | 9.5 |
| Percent volume swelling in water, water temperature (° C.): | | |
| 25 | 0 | −13 |
| 40 | 0 | +123 |
| 60 | 0 | +143 |
| 75 | 0 | +334 |
| 90 | −19 | +60 |
| 100 | +40 | +40 |
| 110 | +25 | +40 |

It is important to note that this polyamide appears to be especially compatible or reactive with the polyether. A larger total amount of the polyether is required to produce the separate polyether phase than the 2% minimum required for most polyamides. A 50% mixture does show a separate polyether phase, as well as antistatic properties. This is illustrated in Example XII.

EXAMPLE VIII

Polyhexamethylene adipamide polymer flake containing 10% polyethylene ether glycol of 20,000 molecular weight is prepared following the procedure for sample B of Example I. The flake is melted, extruded through a spinneret, and drawn to form a bristle of 14-mil diameter. The bristle is evaluated as an antistatic broom for use in explosive areas. Its antistatic properties are equivalent to those of one of the natural cellulosic fibers, Tampico, and are at least ten times better than horsehair which is acceptable for use in such areas. The bristle retains over 75% of its antistatic properties after boiling in water for four hours followed by reconditioning at 50% RH for four days.

When the above test is repeated, using polyhexamethylene sebacamide, similar results are obtained.

EXAMPLE IX

This example illustrates the use in nylon of a polyethylene ether compound which is capped on one end with a nonylphenyl group. The average molecular weight of this compound is about 600, and it has about 10 ethylene oxide units. It is water-soluble, and has a cloud point of 52° C. The procedure of Example I is repeated, with suitable amounts of this polyethylene ether being added as a 50% solution during polyamidation. Polymerization, casting, spinning, and drawing are carried out as in Example I. The log rho of the drawn yarn is determined after a two-hour scour, with the results indicated in Table 7. The fiber appearance under the microscope is also tabulated.

TABLE 7

| Run: | Amount Added (percent) | Log rho (After 2 hr. Scour) | Fiber Appearance Under Microscope |
|---|---|---|---|
| A | 2.5 | 12.1 | Almost no striations. |
| B | 5 | 10.8 | Striations appear. |
| C | 7.5 | 9.9 | Striations more prominent. |
| D | 10 | 9.6 | Striations very prominent. |

Due to the reactivity of this relatively low molecular weight polyether, enough apparently reacts with the polyamide during polymerization so that composition A is almost wholly a single phase, showing almost no striations. Due to the higher concentrations of polyether in runs B-D, the solubility limit or the amount reacting is exceeded, and a second phase is present. The fibers are antistatic.

When run A is repeated, with the difference that in this case 2.5% of the same polyether is melt-blended with the polyamide immediately before spinning, a two-phase striated, antistatic fiber is obtained, since reaction during polymerization is avoided.

When run B is repeated, using a polyethylene ether compound with hydroxyl ends, i.e., a glycol, and an average molecular weight of 600, the additive reacts with the polyamide sufficiently to "solubilize" the glycol, even at the higher (5%) concentration (sample E). No striated polyether phase is produced. Due to reaction between adipic acid and the glycol during polyamidation, the polymer has a low molecular weight.

EXAMPLE X

This example illustrates the use in nylon of varying molecular weight, singly capped polyethylene ether compounds. The polyethylene ether compounds are capped on one end with a nonylphenyl group. Ten percent (10%) of the compound is employed. The procedure for run D of Example XI is followed. The results are indicated in Table 8, showing log rho after a one-hour scour.

TABLE 8

| Run: | Average Mol. Wt. | Log rho, after one-hour scour |
|---|---|---|
| A | 385 | 12.4 |
| B | 640 | 9.9 |
| C | 1,600 | 9.6 |
| D | 4,600 | 9.6 |

It is noted that the low molecular weight compound of run A provides insufficient static protection for most uses. Good static protection is obtained using the other additives.

EXAMPLE XI

Reduced loss of antistat by use of capped polyether

Yarn samples are prepared according to the process of Example I to contain (A) 10% of a nonyl phenyl capped polyethylene ether alcohol (—OH at one end of the polyether chain), having a molecular weight of about 650, and (B), 10% of a polyethylene ether glycol of 20,000 molecular weight. The yarn samples are knit to tubing, weighed and extracted at the boil with distilled water. Samples are dried and weighed periodically; the weight loss (corrected for weight loss of a similarly treated unmodified nylon sample) enables calculation of the amount of antistat remaining.

TABLE 9

| | Test Yarn | |
|---|---|---|
| | A | B |
| Polyether | Nonyl phenyl | Glyco |
| Initial amount, percent | 10 | 10 |
| After 1 hr. extraction, percent | 6.9 | 1.5 |

Surprisingly, the low molecular weight compound is much less extractable than the high molecular weight compound. Extracted sample B is much more opaque than is extracted sample A, due to the presence of many more voids.

EXAMPLE XII

Nylon polymer is prepared from the salt of bis(4-aminocyclohexyl) methane and azelaic acid, following the procedure of Example VII. No antioxidant is added. At 220°, sufficient $TiO_2$ slurry is added to give 0.3% $TiO_2$ in the final polymer. At 245° C., sufficient 40% aqueous solution of the polyether of a nonyl phenyl capped polyethylene ether (mol wt., 1600) is added to make a final concentration of 5.0%. The polymer is extruded and cut to flake, which is subsequently steam-spun from a heated grid melting unit. The yarn is drawn 3.2X over a 110° C. hot pin.

A filling face satin woven from the test yarn gave a log rho of 9.9 after boiling in water for one hour. A corresponding control without antistat has a log rho of over 13.

Only 1.7% (on weight of fabric) of the antistat is removed after eight hours extraction in boiling water. However, the extracted test fabric is noticeably more opaque than the similarly treated control. Examination of the filaments showed a striated structure. The NMR peak ratio for the dry fiber is 2.4.

EXAMPLE XIII

Forty-denier, 13-filament nylon yarn containing 15% polyethylene ether glycol of 20,000 molecular weight, prepared as described in run A of Example I, is tricot knitted into test slips (A) and compared to conventional dull (2% $TiO_2$) nylon tricot (B) and cotton batiste (C) control garments in subjective slip comfort static tests. Each of the items is worn and evaluated by two female subjects for the discomforting effects attendant with static build-up under controlled humidity and temperature conditions (20% RH and 78° F.). Prior to testing, each slip was given ten standard washes.

No perceptible evidence of static or of its effects is encountered with either the test A or the cotton control C; both are rated static-fre. The nylon conrol (B), however, develops a considerable degree of static, causing it to cling to the wearer and to produce an audible static discharge (crackle) when removed by the wearer.

The covering power of the test fabric A and dull nylon control fabric B are compared by measuring light transmittance and light reflectance. The results, adjusted to a fabric weight of 2.5 oz./yd. in each case, are shown in Table 10.

TABLE 10

|  | Test A | Control B |
|---|---|---|
| Percent Light Transmitted | 10.0 | 14.0 |
| Percent Light Reflected | 75.0 | 67.0 |

The test fabric A containing no $TiO_2$ has better covering power than control B which contains 2.0% of the delusterant.

The test is repeated, using melt-blending techniques to prepare an antistatic yarn (D). One component of the blend is 66 nylon polymer containing about 0.3% sodium phenyl phosphinate. The other is polyethylene ether glycol of 20,000 molecular weight, containing about 6.2% (based on weight of the polyether glycol) of a phenolic antioxidant of the formula:

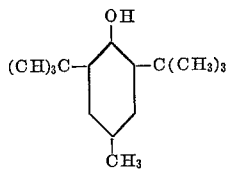

The two components are melted in individual screw-melters, and are fed to a power-driven homogenizer. The feed ratio is controlled to provide a final composition containing 7.5% of the polyether glycol, 0.3% of the phosphinate, and 0.5% of the antioxidant. The blended melt is immediately pumped to a sand pack and spinneret, and spun to yarn. The yarn is drawn, knitted, and made into slips. Slips from D, like A, are fre from static, and are superior in whiteness, being equivalent to B in this respect.

EXAMPLE XIV

Two batches, A and B, of 1040-denier, 68-filament, round cross-section nylon yarn containing 3% and 15% 20,000 molecular weight linear polyethylene ether glycol (PEG) respectively, are steam bulked substantially as described in Belgian Patent 573,230 and tufted into continuous filament carpets. The carpets are mock dyed (using a dye bath at the boil, without dye) during which the PEG concentration is reduced (by extraction) to about 2.5% and 4% for carpets A and B, respectively. The mock-dyed carpets are coded AA and BB respectively. The carpets are tested for static propensity by measuring the electrostatic voltage built up on an individual while walking on the carpets at 70° F., 20% RH. Results are listed below (further controls are given in Example XVII).

TABLE 11

| Carpet | PEG initial, percent | After Mock Dye | |
|---|---|---|---|
|  |  | PEG, percent | Voltage (kilovolts) |
| AA | 3 | 2.5 | 8.5 |
| BB | 15 | 4 | 4.5 |
| Soiled wool | None | None | 5 |

These results illustrate the permanent antistatic protection obtained with the test carpets, especially BB, which is equivalent to soiled wool.

TABLE 12
Subjective Soil Rating [1]

| Carpet | Traffic Cycles | | |
|---|---|---|---|
|  | 4,000 | 8,000 | 12,000 |
| (A) 3% PEG, as tufted [2] | 2.1 | 1.9 | 1.4 |
| (B) 15% PEG, as tufted [2] | 2.3 | 2.2 | 1.5 |
| (AA) 3% PEG, mock dyed | 3.9 | 3.2 | 2.4 |
| (BB) 15% PEG, mock dyed | 4.1 | 3.3 | 2.5 |
| Type 501 nylon (triloban cross section, 0.15% $TiO^2$) | 3.0 | 2.5 | 2.1 |
| Type 101 nylon (round cross section 0.02% $TiO^2$) | 2.1 | 2.0 | 1.5 |

[1] 5=No change from original; 1=severe soiling.
[2] Finish removed by extraction with perchlorethylene, which does not extract PEG.

These results show that carpets A and B, prior to mock dyeing, show no soiling improvement over control type 101 having the same (round) cross section. Soiling properties are inferior to type 501 trilobal control. After mock dyeing (scour), however, carpets AA and BB show significantly improved soil repellence as compared with both unmodified controls.

A third batch of carpet fiber is prepared from polyhexamethylene adipamide by injecting 5% of a molten polyethylene ether glycol of 20,000 molecular weight into the molten polyamide immediately upstream from a polymer mixer. The polymer blend issuing from the mixer is immediately spun into yarn, drawn, and bulked as previously described. Carpets made from the yarn show a static buildup of from 6 to 8 kilovolts after being mock dyed and are notably resistant to soiling.

By means of additional tests of this type, it is discovered that at least about 1% PEG (based on weight of fiber) must be extracted to obtain an improvement in soiling protection.

EXAMPLE XV

The polymer blend of this invention is well suited for spinning fibers of two polymer components, in side-by-side or sheath-core arrangement, as disclosed in U.S. Patents 2,389,173 and 2,931,091.

Polymer batch A is prepared as in Example V (sample A) to contain 7.5% polyethylene ether glycol of 20,000 molecular weight. Polymer B is unmodified polyhexamethylene adipamide (41 relative viscosity). In successive runs, 1020-denier, 68-filament yarns are prepared in which (1) the entire filament consists of B; (2) A is in the sheath, B in the core; (3) B is in the sheath, A in the core; and (4) A and B are spun side by side. About equal amounts of A and B appear in each filament. The yarns (1020 denier, 68 filaments) are spun, drawn, and steam-bulked. They are then made into tufted carpets and tested for static propensity by electric charge accumulation when a person walks across the carpet. The data are shown in the following table.

TABLE 13

| Run | Sample | Static Voltage, Kilovolts | |
|---|---|---|---|
|  |  | Before Scour | After scour and Mock Dye |
| 1 | B 66 nylon control | 12.5 | 12.5 |
| 2 | A in sheath of filaments, B in core | 0.5 | 8.8 |
| 3 | A in core of filaments, B in sheath | 4.3 | 6.0 |
| 4 | Side-by-Side filaments, A and B | 3.1 | 7.6 |
|  | Soiled wool control | 6.0 |  |

When the polyether is in the sheath of the filaments (Run 2), a major portion (80%) of the amount added is extracted during scouring and mock dyeing, resulting in lower static protection. However, when the polyether is in the core of the filaments, loss due to extraction is largely prevented, thus retaining a higher level of static protection.

EXAMPLE XVI

Following the procedure of Run 4 of Example XV, a two component fiber is spun, in which one component is polyethylene terephthalate and the other is 66 nylon containing 15% of linear polyethylene ether glycol of 20,000 molecular weight.

The yarn is spun with a trilobal cross section using two screw melters. The yarn is conventionally draw-twisted over a 90° C. hot pin. Fabric is woven and finished using conventional techniques.

The test fabric has cotton-like static properties even though the antistatic nylon component accounts for only 37% (by weight) of the fabric. Before scouring, the fabric contained an average 5.5% of the polyether, overall. After scouring, the residual polyether is only about 1%, based on weight of fabric. Even this low level of antistatic agent is sufficient to produce cotton-like static properties. The unusual efficiency of the very small amount of antistatic agent is believed to be due to the fact that it is concentrated in some of the filaments in sufficient quantity to make these filaments conductive. The log rho (30% RH) after conventional finishing is 10.3–10.5. Log R for cotton is 13.1 and log rho is 11.0.

The test is repeated, using 2.5% of the nonylphenyl capped polyethylene ether alcohol of 1600 mol. wt. instead of the polyether glycol. The scoured fabric shows antistatic behavior superior to cotton. This is achieved because at least 2% of the polyether modifier was mixed with the nylon component, which thus serves to conduct away static charges developed on the unmodified polyethylene terephthalate component.

EXAMPLE XVII

Modified nylon carpet staple (A) is prepared from a melt blend of polyhexamethylene adipamide containing 10% of polyethylene ether glycol of 20,000 molecular weight. This staple is scoured, mock dyed as in Example XIV, and is then blended with an equal weight of unmodified polyhexamethylene-adipamide staple (B) which had been scoured in perchlorethylene for one-half hour to remove any spin finish. The blend of A and B is carded on the woolen system, spun and woven into a 27-inch wide loop pile carpet. No finish is added to the staple blend during processing. A 4-foot length of this carpet is tested for static propensity by the electrostatic voltage build-up test of Example XIV. The voltage build-up observed is 6.6 kv. This is much better than 10 to 12 kv. for an unmodified nylon carpet of fiber B, and is close to the value of 5 kv. for a soiled wool carpet. Analysis of the modified nylon B indicates that the scoured staple contains 4.1% of the polyethylene ether glycol.

A third lot C of carpet staple is prepared, containing 15% polyethylene ether glycol of 20,000 molecular weight. When as little as 10% of staple C is blended with 90% of unmodified 66 nylon, staple yarn spun from the staple blend has a log R of 13.7 after scouring. This compares favorably with a log R of 14.8 for yarn from unmodified nylon B.

It is thus apparent that as little as 10% by weight of the modified antistatic nylon staple of this invention produces significant antistatic effect when blended with as much as 90% of conventional 66 nylon fiber.

EXAMPLE XVIII

Yarn from polyhexamethylene adipamide is prepared substantially as described in Example I. The yarn contains 5% of polyethylene ether glycol of 1500 molecular weight. It has a relative viscosity (defined in U.S. Patent 2,385,890) of 17.3, 50 equivalents of amine ends and 94 equivalents of carboxyl ends. The yarn is knit into tubing, and is coded Sample A. A control fabric B is prepared from yarn containing no polyether.

Swatches of test A and control B fabric are scoured for one hour at 80° C. Examination of the test fabric shows that the fiber has become more opaque, and that it contains microscopic voids, due to removal of some of the polyether glycol. No change is observed in the control fabric. Both swatches are then dyed in a bath containing 5% of "Ponsol" Red BN (C.I. No. 68,000) for one hour at 80% C., followed by one-half hour at 90° C. The fabrics are conventionally air oxidized and soaped. Examination of the as-dyed test fabric shows the presence of numerous dye particles inside the fiber.

Swatches of the dyed fabrics A and B are exposed in the Weatherometer for twenty hours. Test swatch A shows slight fading, as compared with very bad fading for the control B.

When the test is repeated, adding 10% instead of 5% of the polyether glycol, similar results are obtained. It was noted that the dyed, knitted sample was resistant to runs and snagging and appeared to have better resilience than control B.

EXAMPLE XIX

Two batches of polymer, A and B, are prepared according to the procedure of Example I. Batch A is polyhexamethylene adipamide, and Bath B is a copolymer of 92 parts hexamethylene adipamide and 8 parts of hexamethylene isophthalamide. Each batch contains 3% of nonylphenoxy capped polyethylene ether alcohol of about 1600 molecular weight. These polymers are cospun from a divided spinneret, drawn as a combined bundle, then woven to fabric. After scouring, the fabric develops a silk-like bulk and hand, due to the differential shrinkage of the cospun yarn. The scoured fabric has a log R of 12.5, as compared to a log R of over 15 for control yarn containing no polyether.

The test is repeated, using 2.5% of the polyether compound in the 66 nylon yarn, cospun with unmodified copolymer B. The fabric bulks on boil-off, and is antistatic.

When the test is again repeated, except that 2.5% of the same polyether compound is added to the copolymer component B (but not to A), an antistatic, bulked fabric is obtained, after boil-off. When dyed, a uniform color is obtained.

Microscopic examination of the structure of B shows that the polyether is present as particles with a diameter of less than 0.5 micron, and a length greater than 10 microns. Log rho of the scoured yarn is 9.9.

The NMR peak ratio of the combined yarn containing equal amounts of unmodified 66 nylon A and copolymer B containing the polyether is 1.5. This value is equivalent to a reading of over 2 for the polyether-containing filaments alone.

EXAMPLE XX

This example shows the effect of interfacial tension in controlling the dispersability of the polyether in polyhexamethylene adipamide (66 nylon). In this example, the molten polyether is injected into the transfer line conducting the 66 melt to the spinning pump. The point of injection is immediately upstream of a power-driven mixer-extruder of the type described by Saxton in U.S. 3,006,029. The effect of varying mixer speed on the dispersion is observed, as well as the spinning and drawing performance of the yarn, and its conductivity in the scoured condition. The surface tension of each of the polyethers, at the temperature of mixing (283° C.) is given in Table 14, and the interfacial tension of the melt blend with 66 nylon is calculated. The surface tension of 66 nylon at 283° C. is 33.8 dynes per cm. All the polyethers of this example are water-soluble ethylene oxide condensation products.

TABLE 14

| Polyether Type | | Molecular Wt. | Surface Tension, Dynes/cm. | Interfacial Tension, Dynes/cm. |
| No. | End Cap | | | |
|---|---|---|---|---|
| 1 | —OH; —OH | 750 | 23.0 | 10.8 |
| 2 | —OH; —OH | 1,500 | 24.4 | 9.4 |
| 3 | Nonyl phenyl; —OH. | 1,600 | 24.9 | 8.9 |
| 4 | —OH; —OH | 3,000 | 25.5 | 8.2 |
| 5 | —OH; —OH | 24,000 | 26.7 | 7.0 |
| 6 | —OH; —OH | 1,000,000 | 27.3 | 6.4 |

When 3% of the polyethers of Table 14 are injected into the transfer line at a constant mixer speed (200 r.p.m.), the polyether particle size is determined on samples of the melt from the spinning pump, and the spinning operability is characterized as recorded in Table 15.

TABLE 15

| No. | Polyether, Mol. Wt. | Interfacial Tension, Dynes/cm. | Particle Dia., Microns | Spinnability |
|---|---|---|---|---|
| 1 | 750 | 10.8 | >30 | Discontinuous. |
| 3 | 1,600 | 8.9 | >20 | Fair. |
| 4 | 3,000 | 8.2 | >10 | Good. |
| 5 | 24,000 | 7.0 | 3-4 | Very good. |

It is observed that as the interfacial tension decreases, the effect of mixer speed decreases, i.e., the two components are easier to melt blend. Thus, varying mixer speed from 40 to 220 r.p.m. for item 5 makes no visible difference in particulate size of the polyether in the melt, nor any noticeable difference in spinnability. Increasing mixer speed for item 2 decreases polyether particle size markedly, and makes a corresponding improvement in spinnability.

EXAMPLE XXI

An autoclave equipped with stirrer is charged with 17.2 kg. water, 9.04 kg. 1,12-dodecanedioic acid and 9.13 kg. of an 88.6% (wt./wt.) methanol solution of bis(4-aminocyclohexyl) methane (70% trans-trans isomer). After purging with $N_2$ and sealing, the autoclave is heated to 135° C. After 30 minutes, the pH is adjusted to 8.3 by addition of diamine. The temperature is increased to 210° C. while distilling off 9.3 kg. of methanol and $H_2O$, then 71 g. 25% aqueous acetic acid and 41 g. of 2% aqueous manganeous hypophosphite are added. When the temperature reaches 230° C., 244 gm. of a 20% aqueous slurry of $TiO_2$ is added, followed by 658 gm. of a 20,000 mol. wt. polyethylene ether glycol in water. The temperature is raised to 300° C., then to 310° C. in 45 minutes. The polymer is extruded after 30 minutes at 310° C., quenched, cut to flake, spun and drawn. A second batch is similarly prepared with a different content of polyether. After scouring, the log rho and NMR peak ratio are determined, along with similar values for a similarly prepared unmodified control. The data are listed in Table 16.

TABLE 16

| Sample | Polyether, percent | Log rho | NMR Peak Ratio |
|---|---|---|---|
| 1 | 3.1 | 10.4 | 1.6 |
| 2 | 5.0 | 10.7 | 1.8 |
| 3 | None | >13 | 0 |

When examined under the microscope, samples 1 and 2 are observed to contain voids which are about 0.2 micron in diameter and over 150 microns long.

EXAMPLE XXII

The shear to which the polymer melt is subjected in the sand filter pack may have an adverse effect in reducing polyether particle size below the range for effective conductivity.

A series of fabric samples, A–D, is prepared from yarn spun from a melt blend of the polyamide bis(4-aminocyclohexyl)methane polymerized with dodecanedioic acid, and about 5% of a nonyl phenyl-capped polyethylene ether alcohol of about 1900 mol. wt. The polymers are mixed in the melt, using a helical bladed mixer at 280 r.p.m. The spinning pack is varied from "light" (coarse sand) to "very heavy" (fine sand). The fabrics are scoured and tested for log R. The results are given in Table 17. The size of the spinneret orifice is held constant, since this, too, can affect polyether particle size, due to the shear produced.

TABLE 17

| Test No. | Pack Composition | Log R, Initial |
|---|---|---|
| 1 | Light | 13.1 |
| 2 | Medium | 13.2 |
| 3 | Heavy | 13.8 |
| 4 | Very Heavy | 13.7 |

Many of the polyether particles in the *undrawn* yarn, tests 1 and 2, are observed to be over 50$\mu$ long, as compared to about 20$\mu$ for items 3 and 4. These observations are made using an optical microscope.

EXAMPLE XXIII

This example shows that poly(alkylene ether) which is too highly dispersed does not provide an antistatic fiber. The dispersion method employed in this example is to spin from small diameter spinneret orifices. The high shear forces in these capillaries break up the polyether globules in the polyamide melt.

Five percent of a polyethylene ether glycol of 20,000 mol. wt. is injected into molten 66 nylon (48 relative viscosity) just upstream of a polymer mixer of the Saxton torpedo type; the polymer mixture is metered by a gear pump to a sand filter pack, and is extruded to filaments through a 34-hole spinneret. The spinneret holes are 50 mils in diameter and 187 mils long. The drawn yarn is about 18 den./filament. The yarn (coded yarn A) is drawn and woven into fabric, which is tested for rate of charge decay and log R, at 55% RH (listed in Table 18). Scoured, undrawn yarn is used to increase visibility of the PEO. Most of the PEO particles in the drawn yarn are about 1 micron in diameter and over 15 microns long.

For comparison, yarn B is prepared exactly like yarn A, except that the spinneret orifices are 11 mils diameter x 34 mils long, producing much greater particle shearing. The yarn has a very fine dispersion of PEO, but a large number of the particles (in the drawn yarn) are less than 10 microns long. Charge decay and log R at 50% RH show very poor antistatic performance for this yarn, as shown by the data in Table 18.

TABLE 18

| | Yarn Test | |
|---|---|---|
| | A | B |
| Spinneret orifice used | 50 x 187 | 11 x 34 |
| PEO particle size range: | | |
| Dia. (microns) | ca. 1 | ca. 1 |
| Length (microns) | >15 | <10 |
| Before Scouring: | | |
| Time to 40% charge decay, min | 0.4 | 5 |
| Log R | 12.3 | 13.4 |
| After Scouring: | | |
| Time to 25% charge decay, min | 2.8 | >10 |
| Log R | 12.9 | 13.5 |

The one-time swelling of polyether-modified polyamide fiber may be exploited to produce changes in fabric geometry, as explained previously, to produce a synthetic fabric having a silk-like hand. It is believed that the fiber is swollen due to absorption of water by hydration of the polyether. At elevated temperatures, sufficient force is developed to distend the fiber. In the distended condition, part of the polyether is extracted, leaving voids which produce opacity. On cooling, the swollen fiber is dehydrated and returns to its former size. Since a large part of the polyether has been removed, the swelling does not occur on a second boil-off. However, the once-only swelling (superior even to silk which swells approximately 45% in water at 100° C.), is believed to be responsible for the silk-like properties observed in fabrics from polyamides which have been modified by the addition of a polyether compound and then extracted.

It has long been the goal to produce a polyamide fabric that approaches more closely the aesthetic characteristics of silk. Two characteristics in which nylon and silk fabrics differ are that the silk has a high flexural rigidity as measured, for example, by the hanging heart test, combined with a liveliness which may be measured by the rate at which induced vibrations are damped out of the fabric. In comparable construction, and at substantially constant flexural rigidity, scoured, polyether glycol modified, nylon fabric has a damping factor which is reduced more than 20% below that of the unmodified 66 nylon control thus approaching silk fabric aesthetics more closely than any wholly synthetic fabric known heretofore.

An additional surprising property of fabric prepared from the filaments of this invention is the resistance to soiling. Resistance to oil spotting has already been mentioned. In addition, the fabric shows less effect from oily and dry soil. This effect is enhanced by high extractability of the polyether. For antisoil effect, at least 1% of the composition (based on fiber weight) and preferably 4% should be extractable. This property is especially desirable in carpets and upholstery.

The modified polymer of this invention may be used as a component of a cospun yarn in which filaments of two or more different compositions are spun simultaneously to make a mixed filament yarn as a component of a side-by-side or a sheath core yarn. The yarn bundle may also be separated and given different treatments wherein a differential shrinkage, bulkable yarn is produced.

The filaments produced in accord with this invention may be used in any state of aggregation, e.g. plexifilament, fiber, staple, flock, yarn, tow, cord, fabric, or the like may be employed, prior to or after the extraction step, to produce any type of fabric, whether knitted, felted or woven. They are suitable as bristles up to 125 mils in diameter for brushes, brooms, and the like. The filaments may be used alone, or may be plied or blended with other natural, synthetic or man-made fiber. The filaments of the invention are readily dyed, bleached, pigmented, printed, or the like. They may be textured, bulked, heat-set, twisted, crimped, or any combination of these processes. Since the dyeability of these filaments is relatively insensitive to process variations in steam bulking, they are especially suitable for producing uniform bulked products. In addition to steam bulking, hot-air bulking as described in Belgian Patent 573,230 may be used. They may be knitted into tricot, jersey, tissue, satinette or circular knit or full-fashioned hose. They may be woven, alone or in combination with other fiber, into taffeta, twill, satin, sand crepe and the like. The fibers are especially useful in the pile of pile fabrics, such as velvet, plush, rugs, carpets, and artificial fur. Rugs and carpets of these fibers are especially useful due to their antistatic properties, attractive luster, and fiber opacity combined with an unexpected degree of soil repellence. Their antistatic behavoir is often so effective that a minor proportion serves to reduce to an acceptable level the static propensity of a fabric in which they are combined with unmodified hydrophobic filaments.

The polyamides to be modified in accord with this invention are synthetic linear polycarbonamides which are characterized by recurring carbonamide linkages as an integral part of the polymer chain.

Suitable polyamides are those melt-spinnable synthetic linear polyamides which are prepared from polymerizable monoamino monocarboxylic acids or their amide-forming derivatives, or from suitable diamines and suitable dicarboxylic acids or from amide-forming derivatives of these componds. Typical of such polyamides are those containing the repeating unit $$—X—Z—Y—Z—$$

wherein —X— and —Y— represent divalent aliphatic, cycloaliphatic or mixed aliphatic-cycloaliphatic groups and —Z— represents the

linkage. Polyhexamethylene adipamide, polycaproamide, i.e., "66" and "6" nylons, polypyrrolidone, polyundecanoamide, polyoctamethyleneoxalamide, and the polyamides from bis(p-aminocyclohexyl) methane and dicarboxylic acids having 9 to 14 carbon atoms are typical. Especially useful polyamides are those in which —X— and —Y— are $(CH_2)_{n-1}$, where $n$ is a positive integer of from 1 to 14 inclusive with the provision that $n$ is not equal to 1 for both —X— and —Y— simultaneously. —X— and —Y— may be the same or different. Other suitable polyamides are those having the repeating structure $$—A—Z—X—Z—$$

wherein —A— is a divalent aromatic radical and —X— and —Z— are as previously defined. Polyhexamethylene isophthalamide and poly(2-methyl hexamethylene terephthalamide) are illustrative of such polymers. Additionally polyamides have repeating units such as $$—A—Z—B—Z—$$

and $$—X—Z—B—Z—$$

wherein —B— is divalent alkaryl (such as xylylene) may be used provided that only the melt-spinnable polymers and copolymers are intended. Another class of suitable polyamides containing other than aromatic intracarbonamide repeating units are those prepared from piperazine, such as those from piperazine and adipic acids, and the like. Melt spinnable polyamides which are copolymers wherein the amide linkage is the predominant linkage and polyamide mixtures are also useful.

It has been pointed out previously that it is advantageous to choose a polyether free from groups which may react during the process of blending the polyether with the fiber-forming polymer. For example, where the polyether compound is to be mixed with a polyamide during polyamidation, amine and carboxyl end groups on the polyether should be esepcially avoided. This can be done by using a polyether glycol or alternatively using a polyether compound which is capped with monofunctional ether ends, e.g., methyl, ethyl, phenyl, alkylphenyl, or the like. However, it may often be possible to employ a polyether having reactive (e.g. ester, urethane), ends if the polymers are blended so late in the process (e.g., after the polymerization is completed or preferably during melting prior to spinning) that there are few reactive ends remaining and the chances of reaction between the polyether and the substrate polymer are remote. The chance for reaction is decreased by reducing contact time during the melting stage.

The polyether employed should preferably be of very high purity. In addition, it should be free from color-forming compounds, particularly those of an aldehyde nature. This is especially important where the polyether is to be subjected to the high temperatures involved in melt spinning.

It is often advantageous to add an antioxidant to the melt blended composition, thereby giving whiter filaments. Preferably the antioxidant is dissolved in the polyalkylene ether before mixing with the polyamide.

Suitable antioxidants are high boiling substituted phenols, for example, those of the formula:

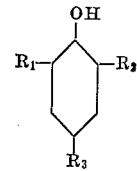

where $R_1$, $R_2$, $R_3$ may be lower alkyl or aryl. The R's may be the same or different. Suitable examples of $R_1$ and $R_2$ are methyl, ethyl, isopropyl or t-butyl; $R_3$ may be methyl, ethyl or phenyl. Polyols such as sorbitol may also be employed. Such antioxidants are added in amounts up to 1.0% of the fiber composition, from 0.2 to 0.5% being preferred.

The polyether-modified filaments of this invention may also contain suitable light stabilizers, ultraviolet absorbers, delusterants, pigments, dyes, and the like. Delusterants and pigments may be added before, along with, or after the polyether. It is often desirable to add an antioxidant, such as, for example, those disclosed in U.S. Patents 2,510,777 and 2,981,715. Of these, sodium phenyl phosphinate is a prefered species.

Other polymer additives may be added to the fibers of this invention, for example to enhance solubility of the polyether, to improve or to decrease ease of extraction, or to affect dyeability, soiling, crease resistance, hand, water repellance, wickability, strength, elongation, modulus, or melting point of the fiber.

The removal of a portion of the polyether compound from the synthetic fiber is achieved by a simple aqueous extraction. This step may be carried out upon the fiber at any stage of processing, i.e., on spun yarn, after drawing, prior to twisting, setting or crimping, in a skein, as a cake, on a dye package or the like. Staple, tow, flock, or spun yarn may be scoured. However, it is preferred that the fiber be extracted when in fabric form, due to the beneficial effect on fabric geometry.

A simple boil-off treatment is usually satisfactory to remove the desired amount of the polyether compound, but the process may be suitably combined with dirt removal by use of an alkaline scouring agent and/or a detergent, which may be natural or synthetic. Highly alkaline solutions must be avoided when treating alkali-sensitive fibers. It may sometimes be desirable to include a swelling agent, for maximum extraction of the polyether with maximum opacification of fiber, especially if antistatic properties are unimportant. Conventional scouring procedures are very satisfactory. Alternatively, polyether may be removed during dyeing or other hot, aqueous treatment.

The extraction step may be carried out while the filaments (in any form) are restrained from shrinkage. Alternatively, shrinkage of any desired extent may be permitted. Maximum increase in fabric bulk and liveliness will be attained by extracting the fabric while free to retract.

What is claimed is:

1. A static-resistant melt-spun drawn synthetic polyamide filament containing as a distinct phase at least 2% by weight, based on polyamide, of a high molecular weight water-soluble poly(alkylene ether) in the form of uniformly distributed elongated particles about 0.05 to about 1.5 microns in diameter and at least 15 microns long, said particles being spaced from each other in overlapping relationship with their longest dimension parallel to the major axis of said filament, said filament being characterized by having a fluid-like molecular motion at room temperature identified by a nuclear magnetic resonance, NMR, peak ratio of at least 1.0, said poly(alkylene ether) containing sufficient ethylene ether radicals to make the poly(alkylene ether) water-soluble.

2. The filament of claim 1 wherein said polyamide is polyhexamethylene adipamide.

3. The filament of claim 1 wherein said polyamide is polycaproamide.

4. The filament of claim 1 wherein said polyamide is prepared from the salt of bis(4-aminocyclohexyl) methane and a dicarboxylic acid.

5. The filament of claim 1 wherein said particles have a diameter of 0.1 to 1.0 micron.

6. The filament of claim 1 wherein said poly(alkylene ether) is a water-soluble poly(alkylene ether) glycol, the alkylene oxide chains being terminated by at least two —OH radicals, having a molecular weight of from 1,000 to about 30,000, said poly(alkylene ether) glycol being present in a concentration of from 3% to 15% by weight based on said polyamide.

7. The filament of claim 6 wherein said poly(alkylene ether) glycol is polyethylene ether glycol.

8. The filament of claim 6 wherein there are at least 15 said particles of 0.1 to 1.0 micron diameter in each filament cross section.

9. A composite anti-soiling, antistatic, melt-spun drawn synthetic polymer filament in which at least one polymeric component is the modified polyamide of claim 6.

10. A yarn bundle of the filaments of claim 6 further characterized by having a uniformity of distribution of the poly(alkylene ether) glycol such that the square of the standard deviation of the density of the scoured filaments, taken across the yarn bundle, is less than $4 \times 10^{-5}$.

11. The filament of claim 1 wherein said poly(alkylene ether) is a capped poly(alkylene ether), the polyether part of the chain constituting at least 50% by weight of said capped poly(alkylene ether) and containing at least 10 ethyleneoxide units, said poly(alkylene ether) being present in a concentration of from about 2% to about 10% by weight based on said polyamide.

12. The filament of claim 11 wherein said poly(alkylene ether) is a polyethylene ether capped on one end with a nonylphenoxy group.

13. A composite antistatic, melt-spun drawn synthetic polymer filament in which at least one polymeric component is the modified polyamide of claim 11.

14. A low density, anti-soiling, static-resistant, melt-spun drawn synthetic polyamide filament containing as a distinct phase at least 0.5% by weight, based on polyamide, of a water-soluble poly(alkylene ether) glycol having a molecular weight of from 1000 to about 30,000 in the form of uniformly distributed elongated particles and having a multiplicity of elongated voids distributed throughout its length, said particles and voids having a diameter of 0.05 to 1.5 microns and a length greater than 15 microns and being spaced from each other in overlapping relationship with their longest dimensions parallel to the major axis of said filament, said filament being characterized by having a fluid-like molecular motion at room temperature identified by a nuclear magnetic resonance, NMR, peak ratio of at least 1.0.

15. The filament of claim 14 wherein said poly(alkylene ether) glycol is a polyethylene ether glycol.

16. A yarn bundle of the filaments of claim 14 further characterized by having a uniformity of distribution of the poly(alkylene ether) glycol such that the square of the standard deviation of the density of the filaments, taken across the yarn bundle, is less than $4 \times 10^{-5}$.

17. The filament of claim 15 wherein the polyamide is polyhexamethylene adipamide.

18. The filament of claim 15 wherein the polyamide is polycaproamide.

19. The filament of claim 15 wherein the polyamide is prepared from the salt of bis(4-aminocyclohexyl) methane and azelaic acid.

20. The filament of claim 15 wherein the polyamide is prepared from the salt of bis(4-aminocyclohexyl) methane and 1,12-dodecanedioic acid.

21. A composite anti-soliing static-resistant, melt-spun drawn filament in which at least one polymeric component is the modified polyamide of claim 15.

22. The filament of claim 21 wherein the polyamide in the modified component is polyhexamethylene adipamide.

References Cited

UNITED STATES PATENTS

| | | | |
|---|---|---|---|
| 2,872,432 | 2/1959 | Metzer | 260—33.2 |
| 2,879,244 | 3/1959 | Coler | 260—33.2 |

ROBERT F. BURNETT, Primary Examiner

LINDA M. CARLIN, Assistant Examiner

U.S. Cl. X.R.

161—174, 180; 252—8.9; 260—849